United States Patent
Moyer (10) Patent No.: US 6,766,431 B1
(45) Date of Patent: Jul. 20, 2004

(54) DATA PROCESSING SYSTEM AND METHOD FOR A SECTOR CACHE

(75) Inventor: William C. Moyer, Dripping Springs, TX (US)

(73) Assignee: Freescale Semiconductor, Inc., Austin, TX (US)

(*) Notice: Subject to any disclaimer, the term of this patent is extended or adjusted under 35 U.S.C. 154(b) by 743 days.

(21) Appl. No.: 09/594,411

(22) Filed: Jun. 16, 2000

(51) Int. Cl.[7] .............................................. G06F 12/00
(52) U.S. Cl. ...................... 711/168; 711/141; 711/207; 711/156
(58) Field of Search ................................ 711/119, 123, 711/205, 207, 141, 143, 144, 145, 168, 156

(56) References Cited

U.S. PATENT DOCUMENTS

| | | | |
|---|---|---|---|
| 3,800,292 A | * | 3/1974 | Curley et al. ............... 711/129 |
| 4,493,026 A | | 1/1985 | Olnowich |
| 5,673,414 A | * | 9/1997 | Amini et al. ............... 710/107 |
| 5,765,190 A | | 6/1998 | Circello et al. |
| 5,890,195 A | * | 3/1999 | Rao ........................... 711/104 |
| 6,092,172 A | * | 7/2000 | Nishimoto et al. ......... 711/203 |
| 6,185,637 B1 | * | 2/2001 | Strongin et al. ............. 710/18 |

* cited by examiner

Primary Examiner—Matthew Kim
Assistant Examiner—Matthew D. Anderson
(74) Attorney, Agent, or Firm—James L. Clingan, Jr.

(57) ABSTRACT

A data processing system (10) provides a set of user configurable control bits in a cache control register (50) that sets a cache fill policy. The data processing system also allows a cache fill policy to be dynamically set via bits in the TLB. Therefore, the cache fill size can be optimized, both statically or dynamically, for the characteristics of the integrated system and can be varied as parameters of a system vary.

16 Claims, 5 Drawing Sheets

MODULO 4 TRANSFERS

| | | | | | | | | |
|---|---|---|---|---|---|---|---|---|
| CRITICAL WORD → | 1 | 2 | 3 | 0 | 4 | 5 | 6 | 7 |
| 2ND WORD | 2 | 3 | 0 | 1 | 5 | 6 | 7 | 4 |
| 3RD WORD | 3 | 0 | 1 | 2 | 6 | 7 | 4 | 5 |
| 4TH WORD | 0 | 1 | 2 | 3 | 7 | 4 | 5 | 6 |

TRANSFER ORDER ↓

MODULO 8 TRANSFERS

| | | | | | | | | |
|---|---|---|---|---|---|---|---|---|
| CRITICAL WORD → | 0 | 1 | 2 | 3 | 4 | 5 | 6 | 7 |
| 2ND WORD | 1 | 2 | 3 | 4 | 5 | 6 | 7 | 0 |
| 3RD WORD | 2 | 3 | 4 | 5 | 6 | 7 | 0 | 1 |
| 4TH WORD | 3 | 4 | 5 | 6 | 7 | 0 | 1 | 2 |
| 5TH WORD | 4 | 5 | 6 | 7 | 0 | 1 | 2 | 3 |
| 6TH WORD | 5 | 6 | 7 | 0 | 1 | 2 | 3 | 4 |
| 7TH WORD | 6 | 7 | 0 | 1 | 2 | 3 | 4 | 5 |
| 8TH WORD | 7 | 0 | 1 | 2 | 3 | 4 | 5 | 6 |

TRANSFER ORDER ↓

DATA PROCESSING SYSTEM AND METHOD FOR A SECTOR CACHE

FIELD OF THE INVENTION

The present invention relates generally to data processing systems, and more particularly, to a data processor having cache memory.

RELATED ART

In general, data processing systems comprise a central processing unit (CPU) that executes instructions that are fetched from a main memory. One method to improve the performance of the CPU is to use cache memory. Cache memory is high speed memory that works in conjunction with the CPU and the main memory to provide the necessary data to the CPU. With this architecture, a faster response time is possible than if the CPU fetches all instructions and operands directly from main memory. The improved performance is possible because the cache usually contains the data that the CPU is most likely to request from memory in the next bus cycle. The cache is typically much faster than the main memory; therefore, the cache can usually provide the data required by the CPU much faster than the main memory. Part of the methodology used to load data into the cache is to predict and store the data that is frequently used by the CPU and is likely to be used by the CPU in the next bus cycle.

When the cache contains data requested by the CPU, this is referred to as a cache hit. If the cache does not contain the information requested by the CPU, then this is referred to as a cache miss. On a miss, the data is loaded from the main memory into the cache and is also provided to the CPU. The data is loaded into the cache in anticipation that the CPU will request the data in an upcoming bus cycle. This process continues throughout the operation of the data processing system.

Caches typically consist of a cache tag array and a cache data array. Each array is organized into a number of cache lines. Each cache line consists of a tag portion (contained in the cache tag array) and a data portion (contained in the cache data array). The tag value in a line is compared with the address of a memory request from the CPU to determine if the requested data is present in the data portion of that cache line. Validity information is associated with each cache line to indicate whether the line contains currently valid data. In addition, for caches which can operate in a copyback or writeback mode, additional status information is retained to indicate whether the cache line is modified (dirty) relative to the value stored in main memory.

One cache memory organization technique is known as sector caching. Sector caches reduce the overhead associated with the cache tag array by associating multiple blocks of data with a single tag. Multiple blocks of data are contained within a given cache line, with a validity bit and a dirty bit associated with each block. On a cache miss, a block of data in the cache line is filled.

One problem with prior art sector caches relates to memory designs that support burst fill accesses (or fill sizes) to fill the cache after a miss. Burst accesses are characterized by having an initial access latency of longer duration than successive accesses within the burst. These successive burst accesses are typically sequential or modulo in nature from the initial access, and can be completed in a relatively short time. Many memory designs supporting burst mode accesses contain internal modulo counters that internally increment the initial access address modulo N as the burst access proceeds. This modulo counter wraps around to the initial address once the burst is complete. Burst transfers require significantly fewer cycles to complete than a set of individual memory transfers, and thus improve system performance when utilized in conjunction with a cache memory. Burst lengths of 4 or 8 units are common parameters for both caches and memory devices. Typical caches implement a single line size and fill the lines with a fixed number of transfers, typically 4 or 8 units. However, some memory devices limit the burst support to either 4 or 8 units, and do not support both in a single device. As a result, a cache designed for a given fill length is unable to utilize the high performance burst transfers of the memory devices designed for the different length.

Another problem with prior art caches relates to stalls of the CPU that can occur while line fills are performed. Caches can cause a CPU to stall while line fills are performed when the line fill requires 4 or 8 units of transfer to be performed and the CPU does not request all of these units in sequence. In many cases, the CPU must wait for all of the data to be fetched before continuing with the next access, since the cache is busy with the fill. Thus, to minimize these cache-busy stalls, a small fill size is beneficial.

As a result of these problems, there is a trade-off between associating a large amount of data with a tag (for less tag overhead) and decreasing the cache fill fetch time when defining a cache fill policy. In other words, it is desirable to associate more data with each tag, but that increases the fetch time since more data must be read.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

In general, the present invention relates to a method for accessing information in cache in a data processing system using multiple cache fill policies or cache fill modes. Generally, one embodiment of the present invention provides a cache control unit having a set of user configurable control bits in a cache control register that selects a fill size of either 4 or 8 units (described below). Therefore, the fill size can be optimized, both statically and dynamically, for the characteristics of the integrated system and can be varied as parameters of a system vary.

Figure 1:
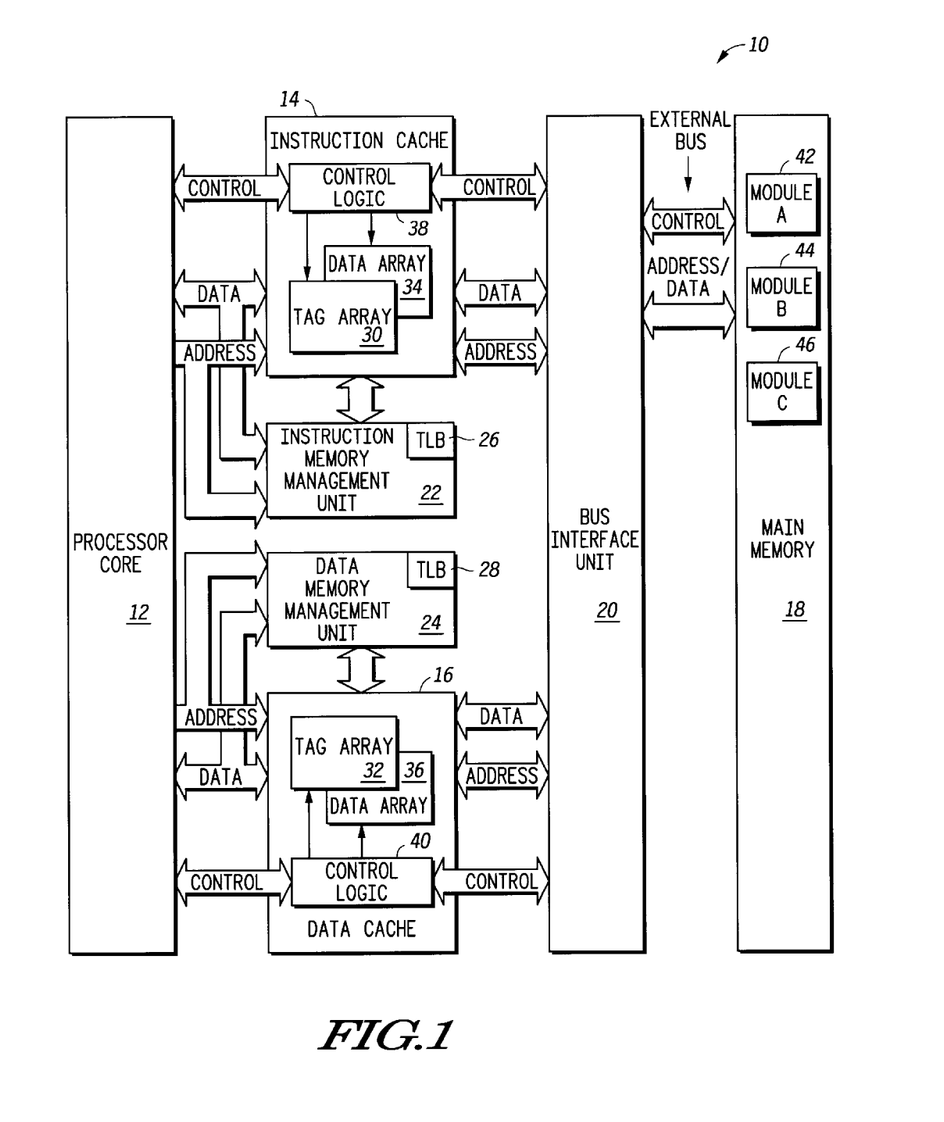
FIG. 1 is a block diagram of a data processing system of the present invention.

FIG. 1 is a block diagram of a data processing system 10 having a CPU or processor core 12. The data processing system 10 also includes an instruction cache 14 and a data cache 16. While FIG. 1 shows separate instruction and data caches, the invention also applies to systems having a single unified cache. The data processing system 10 is connected to main memory 18 via a bus interface unit 20. The main memory 18 is managed by instruction memory management unit (MMU) 22 and data MMU 24, in which each includes a translation lookaside buffer (TLB) 26 and 28 (described below). Each cache 14 and 16 includes a tag array 30 and 32, and a data array 34 and 36, respectively. Each cache 14 and 16 also includes control logic 38 and 40, which controls the various operations of the caches 14 and 16. The main memory 18 is comprised of one or more memory devices, shown as module A 42, module B 44, and module C 46 in FIG. 1. The components of the data processing system 10 are coupled together by various busses used to pass address and data signals.

Figure 2:
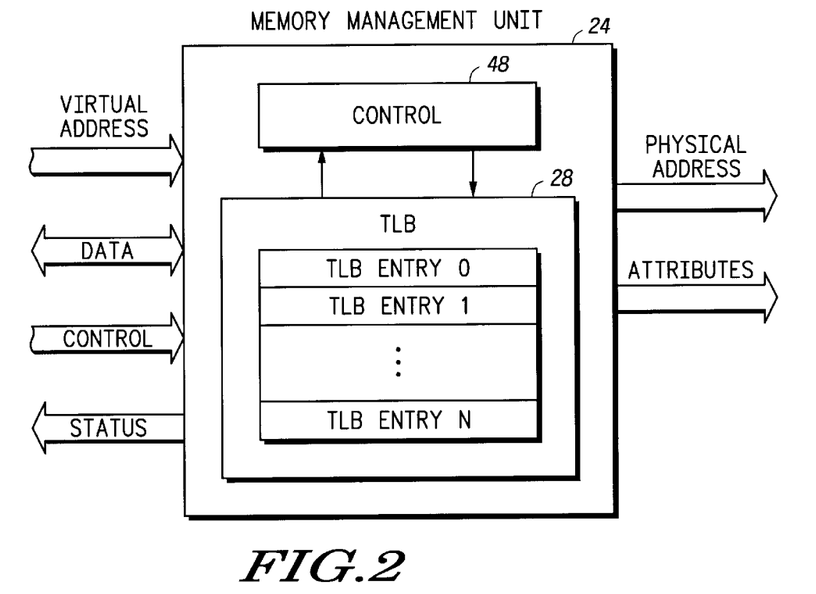
FIG. 2 is a block diagram of one of the memory management units shown in FIG. 1.

FIG. 2 is a block diagram of the MMU 24 shown in FIG. 1. Note that while the data MMU 24 is shown, the following description also applies to the instruction MMU 22. As mentioned above, the MMU 24 is coupled to various busses for sending and receiving control information, address information, and data. The MMU 24 includes TLB 28 which contains N TLB entries used for translating virtual addresses to physical addresses. Each TLB entry includes information relating to virtual addresses, address space, data validity, physical addresses, and burst length (described below). The TLB 28 is also connected to a TLB controller 48. The function of the TLB controller 48 is to control translation of logical addresses to corresponding physical addresses, to provide access and control attributes associated with these translated addresses, and to control other secondary operations of MMU 24 such as reading and writing TLB entries.

In general, when the processor core 12 makes a memory access request, the appropriate MMU 22 or 24 will translate the virtual address of the request, via the TLB 26 or 28, and determine the corresponding physical address for the access. Note that some address requests contain the physical address directly, and do not require translation. The cache memory then determines whether the information requested by the processor core 12 is present in cache by comparing tag information in the request to tag information in the tag array 30 or 32. If the requested information is determined to be present in cache, the information is read from the data array 34 or 36 and sent to the processor core 12. If the requested information is not present in cache, the system accesses the main memory 18 using the physical address determined via the TLB 26 or 28. The requested information is then filled into cache and is also sent to the processor core 12.

Figure 3:
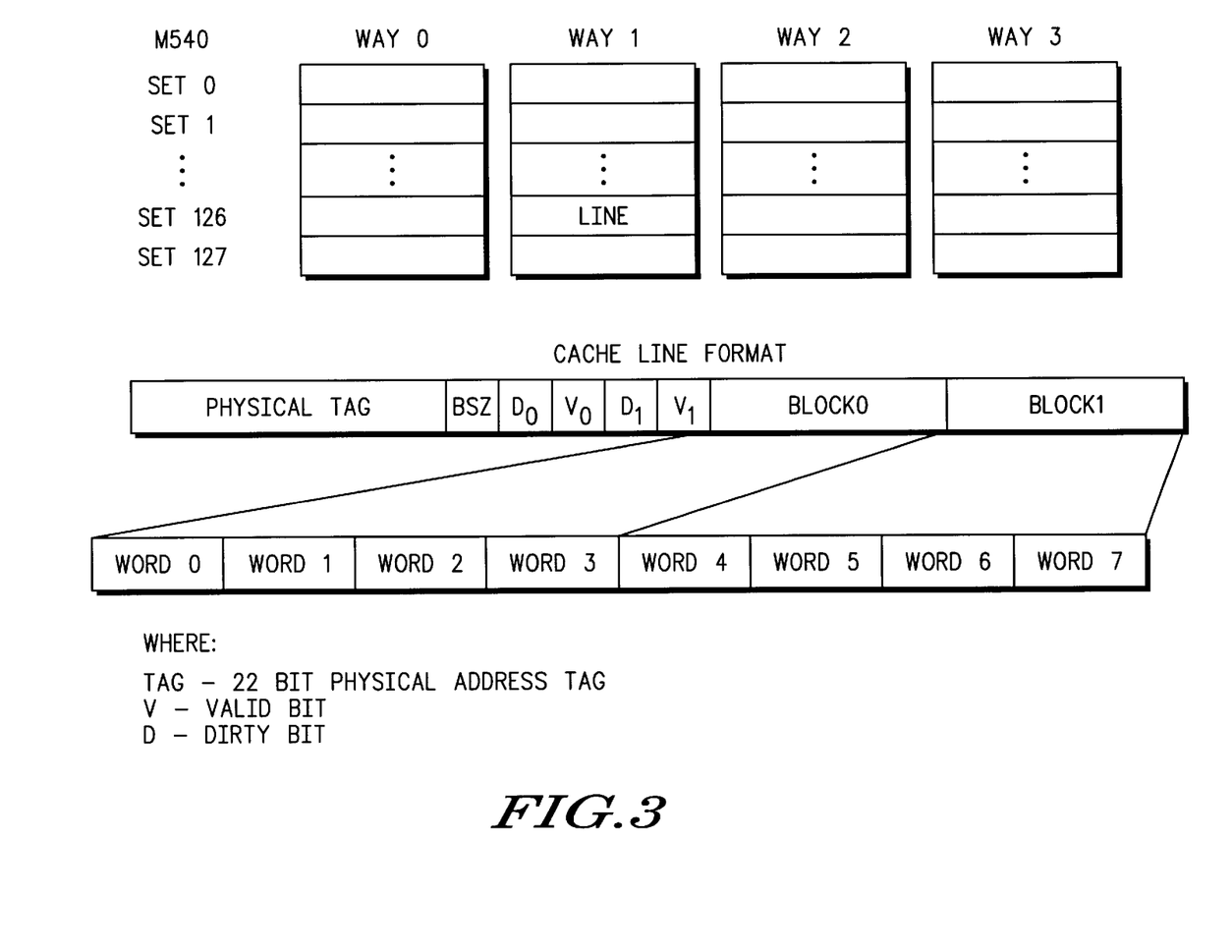
FIG. 3 is a diagram illustrating the organization of a 4-way set associative cache.

FIG. 3 is a diagram illustrating the organization of a 4-way associative cache used in one embodiment of the present invention. Note that the invention is not limited to this organization or to associative caches. FIG. 3 shows 4 ways (WAY 0, WAY 1, WAY 2, and WAY 3), each having 128 sets (SET 0, SET 1, . . . SET 126, and SET 127). Each way includes a line (or sector) corresponding to each set. Therefore, for each set, there are 4 lines, one corresponding to each way. Each sector includes a plurality of blocks and each block includes at least one word location. For example, FIG. 3 illustrates the format for each line. Each line consists of two blocks (BLOCK0, BLOCK1), each containing four words. Any data stored in cache is contained in one of the blocks. Each line also includes a physical address tag (PHYSICAL TAG) which corresponds to the physical address of the data contained in the blocks. Each line also includes valid bits $V_0$ and $V_1$ which signify whether or not the cache blocks BLOCK0 and BLOCK1, respectively, contain valid information. Each line also includes dirty bits $D_0$ and $D_1$ which are set to "1" when the data contained in the corresponding block has been modified by the CPU and is therefore not consistent with the information in the corresponding physical memory location. If the data in a block is "dirty", the modified data must eventually be written to the physical memory location. This process is referred to as "copy-back". Note that by providing individual dirty bits, only blocks which have actually been modified are required to be written back to memory, thus the overhead for performing a copy-back may be minimized by examining the state of both bits when a line is replaced. If only a single block is dirty, then a shorter sequence of transfers may be utilized in updating the main memory.

As shown in FIG. 3, each line also includes a burst size (BSZ) bit which is a status bit used when performing copy-back operations on a dirty line (described below). The burst size bit BSZ is initialized when a cache line is first allocated on a read miss. A "0" signifies that the cache line corresponds to an area of memory with a 4 word burst size. A "1" signifies that the cache line corresponds to an area of memory with an 8 word burst size. Of course, the BSZ convention could be reversed, or could include more than one bit. Use of the BSZ bit is described below.

Figure 4:
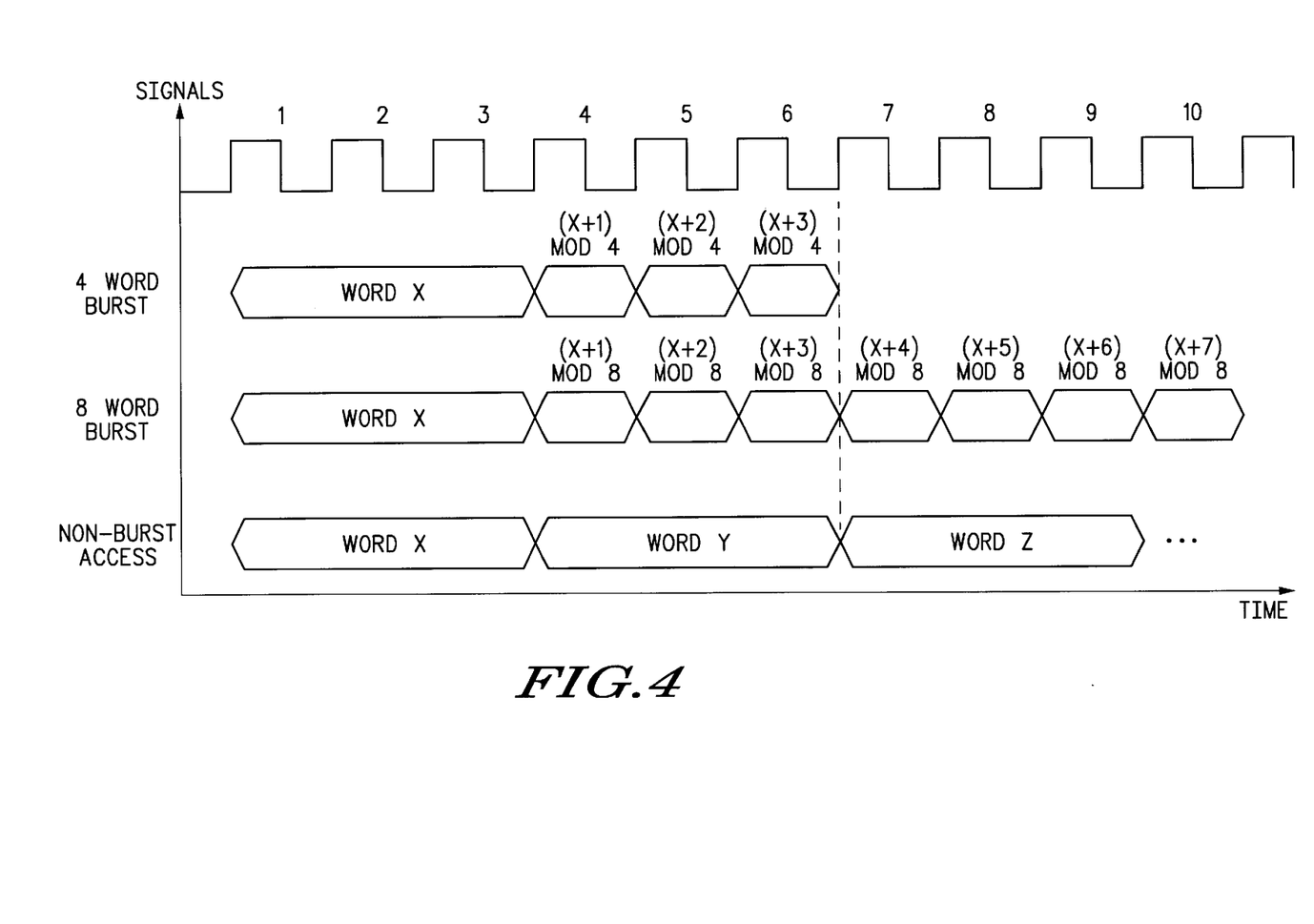
FIG. 4 is a timing diagram illustrating data access times of systems using 4 word burst, 8 word burst, and non-burst accesses.

As described above, after a "miss" of a cache data request, data corresponding to the requested address is filled into an appropriate cache line. Due to the structure of a sector cache, a single block of data is all that is required to be fetched on a cache miss. The advantage of a sector cache organization is that tag overhead in the cache may be minimized by associating multiple blocks of data with a single tag value, while the capability of filling only a single block of data on a cache miss minimizes CPU stalls while waiting for a burst fill operation to complete. To completely fill a cache line having two 4 word blocks, the system must fetch 8 words from the main memory. Performing conventional, non-burst data accesses requires multiple clock cycles per word. FIG. 4 is a timing diagram illustrating the relative timing for non-burst data accesses, a 4 word burst data access, and an 8 word burst data access. The diagram shown in FIG. 4 assumes that 3 clock cycles are required to fetch one word. The actual number of clock cycles required to fetch one word varies system to system. As shown, using conventional non-burst data access, fetching 4 words would take 12 clock cycles. Similarly, fetching 8 words would take 24 cycles. As shown, the first word (WORD X) is fetched during cycles 1, 2, and 3. The second word (WORD Y) is fetched during cycles 4, 5, and 6, and so on.

Since the CPU usually only needs data from one of the words in a requested block to fulfill a given access request, it is advantageous to retrieve the desired word (the "critical word") first, then retrieve the remaining words from the block to complete the cache fill. Therefore, a technique is commonly used for fetching the critical word first, then quickly fetching the remaining words in a block. This technique is known as a "burst fetch performed critical word first".

Figure 5:
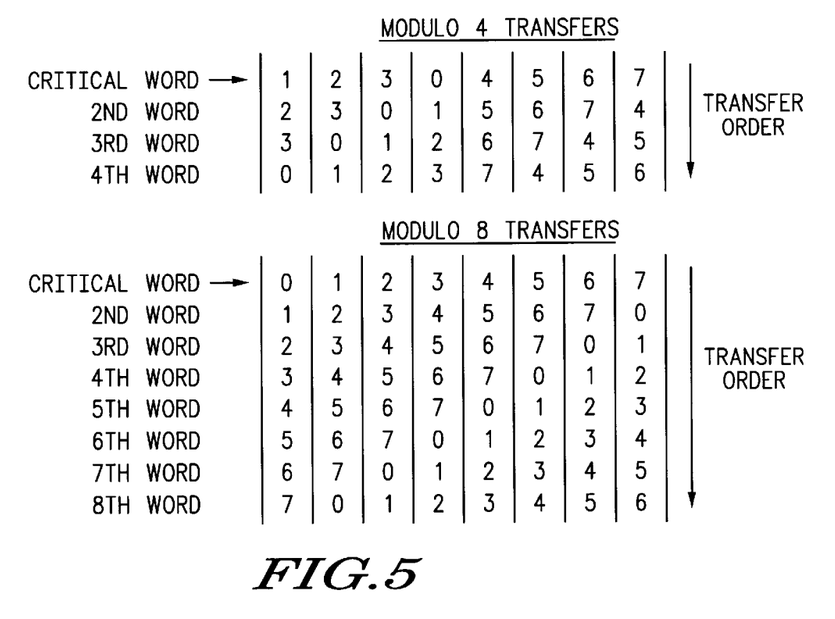
FIG. 5 illustrates the transfer order of modulo 4 and modulo 8 data.

FIG. 4 illustrates the timing of a 4 word burst (modulo 4) and an 8 word burst (modulo 8). As shown, using a 4 or 8 word burst, the first word (WORD X) takes 3 cycles to fetch. However the remaining words are fetched in a much shorter time period. Therefore, the total fetch time for the burst is considerably less than it would be for a set of individual non-burst data accesses. FIG. 5 illustrates the word order for modulo 4 and modulo 8 data transfers. Since the critical word is fetched first, and will not always be WORD 0, the words in each block will not be transferred in order (e.g., WORD 0, WORD 1, etc.). Therefore, for a 4 word burst, a modulo 4 technique is used to fetch the remaining three words. After the critical word is transferred, the low order two bits of the initial word address are incremented by 1, and the next word (X+1 MOD4) is transferred (see FIG. 4). The uppermost bits of the access address are unaffected during the burst, and for a modulo 4 burst, the low order two bits (corresponding to a modulo 4 counter) will count up to 3, and then wrap back to 0. For example, if the critical word is WORD 2, the order of the remaining words will be WORD 3, WORD 0, WORD 1. This word order, as well as other possible word orders are illustrated in FIG. 5. Similarly, if 8 word bursts are used, a modulo 8 technique is used to fetch the remaining seven words. For example, if the critical word is WORD 2, the order of the remaining words will be WORD 3, WORD 4, WORD 5, WORD 6, WORD 7, WORD 0, WORD 1 (FIG. 5). It can be seen for a modulo 8 burst, the low order three bits of the initial word address are incremented, wrapping from a value of 7 back to a value of 0. The remaining uppermost address bits do not change during a modulo 8 burst.

One problem with prior art systems is that a processor and a memory device must each be configured to perform either modulo 4 or modulo 8 burst transfers. Therefore, if a processor is only capable of a modulo 4 burst transfer, it can not perform a modulo 8 burst transfer with a memory configured to support only modulo 8. The reverse is also true.

As mentioned above, the present invention optimizes the fill size for the characteristics of the integrated system and can be varied as parameters of the system vary. In other words, the invention provides a mechanism for performing either 4 word bursts or 8 word bursts, (using the appropriate modulo address sequence) depending on the capabilities of the systems. In the case of a 4 word burst, a single 4 word block in a cache line is filled when a cache miss occurs. For the case of an 8 word burst, a pair of blocks in a cache line are treated as a single larger 8 word block to be filled on a cache miss. This selectable optimization improves performance of the data processing system by matching the capabilities of the selected memory device for performing the fill operation. Referring back to FIG. 3, when performing a modulo 4 burst to fill the cache, a single block (either Block 0, or Block 1) is filled, preferably beginning with the address of the critical word within the appropriate block. At the successful completion of the fill, the valid bit associated with the block which was fetched will be set to indicate the block data is now valid. When a modulo 8 burst fill is performed, both blocks in the line are fetched, preferably beginning with the critical word, and following the successful completion of the fill, both valid bits associated with the blocks which were fetched will be set to indicate the data is now valid. Note that when using modulo 8 fills, the burst sequence allows one block to be partially filled, the alternate block to then be filled, and finally, the fill of the initial block to complete, rather than filling the two blocks in order.

Figure 6:
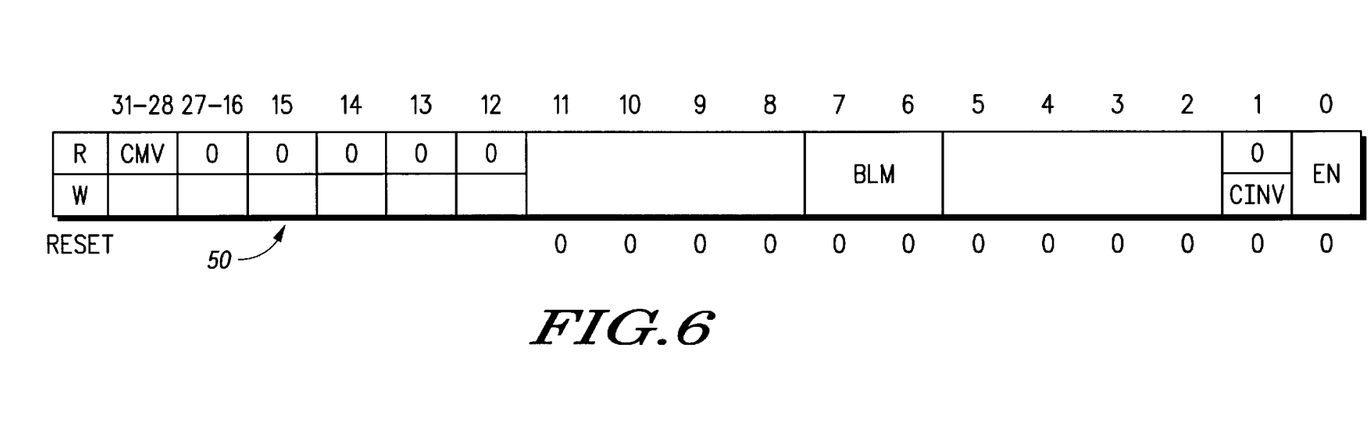
FIG. 6 is a diagram illustrating the data format of a cache control register of the present invention.

FIG. 6 is a diagram illustrating a cache control register 50 in one embodiment of the present invention. The cache control register 50 is a 32-bit register which stores various information used for the operation of cache. The cache control register 50 includes a global cache enable (EN) bit which enables or disables the cache. A cache invalidate all (CINV) bit is a write-only bit which, when enabled, invalidates all cache entries and clears the cache replacement pointer. Other information stored in the cache control register 50 not directly relevant to the current invention will not be described. The cache control register 50 also includes burst length mode (BLM) bits which provides a mechanism for optimizing the cache fill size based on the particular type of memory device being accessed. The values of the BLM bits instruct the cache whether to use a fill size (burst length) of 4 or 8 units. As a result, the fill size can be optimized by properly setting the values of the BLM bits.

In one embodiment, the BLM is comprised of 2 bits, providing 4 possible values, illustrated below:

00 burst length is 4 units
01 burst length is 8 units
10 burst length is defined by the MMU, un-translated accesses use a length of 4 units
11 burst length is defined by the MMU, un-translated accesses use a length of 8 units If the BLM bits are equal to 00 or 01, a burst length of 4 or 8 units is used. If the BLM bits are equal to 10 or 11, the burst length is defined by the MMU (described below). Some address requests include a physical address and therefore do not require translations (i.e., un-translated accesses). In this case, and where the burst length is defined by the MMU, the burst length is determined by the value of the second bit. Note that in one embodiment of the current invention, selecting a burst length of 4 units causes a single block in the cache line to be filled utilizing one of the Modulo 4 Transfer fetch sequences shown in FIG. 5. Selecting a burst length of 8 units causes both blocks in the cache line to be filled with a single burst transfer utilizing one of the Modulo 8 Transfer sequences shown in FIG. 5. The particular sequence is typically selected based on the address of the critical word being requested, although in alternate embodiments, other selection criteria may be used.

A first feature of the invention allows the burst size to be controlled statically by controlling the BLM bits in the cache control register 50 to indicate a 4 unit or 8 unit burst length. Note that the BLM could be comprised of only 1 bit, where the value of the bit sets the burst length at either 4 or 8 units. If the main memory being accessed is compatible with Modulo 4, the BLM is set to 00. Similarly, if the main memory being accessed is compatible with Modulo 8, the BLM is set to 01. As a result, no matter which type of memory device is being accessed, the cache can be filled using the optimal burst length and corresponding fill sequence of addresses.

Another feature of the invention allows the burst size to be controlled dynamically by allowing the MMU to define the burst length. As mentioned above, if the BLM bits are set to 10 or 11, the burst length is defined by the MMU, rather than statically set at 4 or 8 units by the BLM bits. The burst length is defined by the MMU via the TLB, as is described below. For un-translated accesses, a default burst length of either 4 units (BLM=10) or 8 units (BLM=11) is used. In one embodiment of the present invention, a unit as described herein may correspond to a single word of information, typically 32-bits. In alternate embodiments, units may correspond to more or fewer bits of information such as 64 bits or 16 bits.

Figure 7:
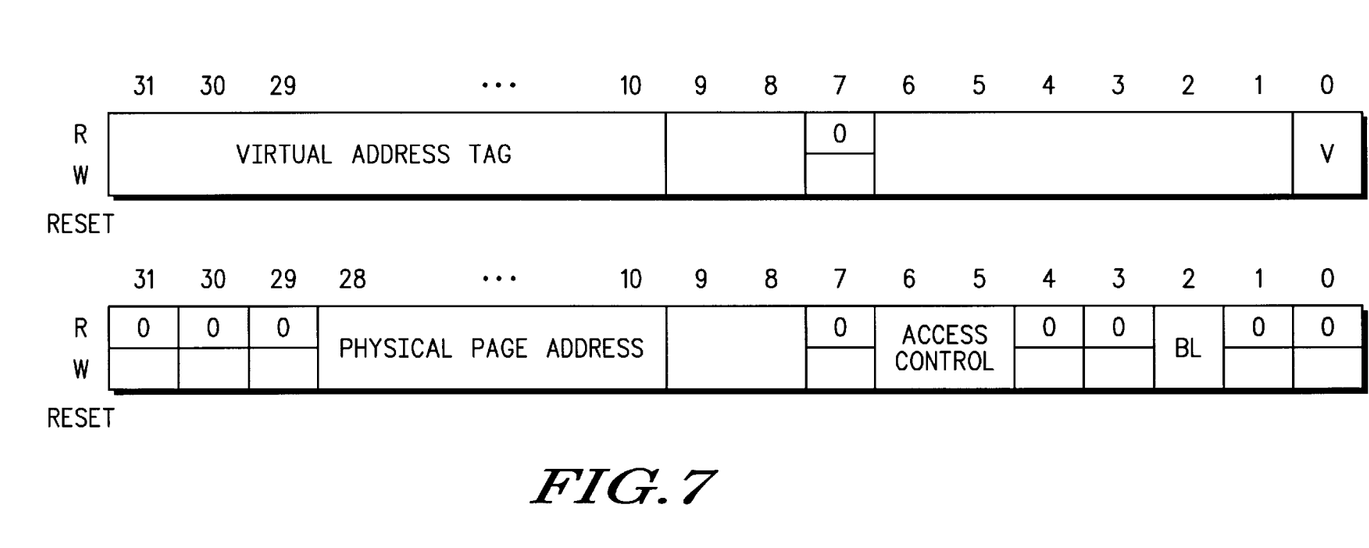
FIG. 7 is a diagram illustrating the format of a TLB entry of the present invention.

For the MMU to define the burst length via the TLB, a bit is added to each TLB entry which defines the optimal burst length for the memory device corresponding to the physical address of the request. FIG. 7 is a diagram illustrating a TLB entry of the present invention. The TLB entry includes various attributes including Virtual Address Tag which is mapped by the TLB entry. The Virtual Address Tag is that address which is compared to an address requested by the processor to determine if the requested virtual to physical address translation is present in the TLB. The TLB entry also includes a Physical Page Address which corresponds to the physical memory address (the translated address) in which the requested information is stored. The TLB entry also includes a valid bit V which can be enabled or disabled to tag the TLB entry as valid or invalid. As shown in FIG. 7, the TLB entry includes a burst length status bit BL which defines the optimal burst length for the specific memory device corresponding to the physical page address. In one embodiment, the BL bit is set to 0 for a burst length of 4 units, and set to 1 for a burst length of 8 units. Of course, these values could be reversed. In other words, if the memory device corresponding to the physical address in the TLB is a Modulo 8 memory device, the BL bit will be set to 1. Note that since the same main memory 18 may include several different memory devices (e.g., modules 42, 44, or 46 in FIG. 1), the cache of the present invention is capable of optimizing the burst length based on the capabilities of the specific memory device being accessed. In other words, even if multiple memory devices are used having different burst lengths, the cache of the present invention can use the optimal fill size for each individual memory device as it is actually being accessed.

Another feature of the invention allows the optimization of the copy-back process described above. As mentioned above, when a cache line includes dirty blocks, the blocks must be written to main memory before filling the cache line with other data. When information is written to the cache line, the BSZ bit is set depending on the cache fill policy used to fill the cache line (e.g., 4 or 8 word burst). Therefore, when the dirty blocks are copied back to the main memory, the same optimized burst access policy can be used. In the case of both dirty bits being set (indicating both blocks of data must be written back to main memory), the BSZ bit can be used to select whether a modulo 8 burst sequence may be used, or whether a modulo 4 burst sequence is required. If modulo 4 is indicated, the blocks are individually copied back using a pair of four word bursts. Otherwise, a single modulo 8 burst may be performed to copy the pair of blocks to memory. If only a single block is dirty, and the BSZ bit indicates a modulo 4 fill policy was used, then only the single dirty block is copied back. As an optimization to the copyback sequence, if only a single block is dirty and a modulo 8 burst was used to fill the line, it may be possible to perform only the initial portion of a modulo 8 burst sequence, and then terminate the sequence early once the four words associated with the dirty block have been transferred to memory.

Another feature of the invention relates to using separate fill policies for instruction versus data operations. Using separate instruction and data caches such as that shown in FIG. 1 allows the use of separate fill policies, if desired. In some circumstances, it is desired to use separate fill policies. These separate fill policies may be defined by providing independent specifiers such as the BLM field shown in FIG. 6. For example, instructions are typically accessed sequentially, while data typically is not. Therefore, is may be desired to use a longer Modulo 8 sequence to fill the instruction cache and a different policy to fill the data cache, since a longer burst sequence may be beneficial when processing sequentially stored instructions. Likewise, for certain types of data, different fill policies may be desired. For example, is may be advantageous to use Modulo 8 for accessing data items which are essentially sequential data (e.g., strings, vectors, or matrices), and other fill policies for other types of data. Randomly structured data items may be more beneficially accessed using a shorter burst sequence such as Modulo 4 in some circumstances.

The present invention provides the capability of utilizing these different fill sizes independently for instruction accesses and data accesses, as well as using different fill policies for different types of structured data, since the fill policies may be independently specified statically or dynamically. When initializing an entry in the TLB, system software may select the fill policy independently for each page of memory based on the optimal policy for the type of information corresponding to the page of memory. By allocating data items in appropriate memory locations based on the nature of the data type, optimal fill policies may be selected. Execution profiling and other well known techniques may be used to tune the settings of the fill policy for each page of memory independently of any other page of memory in order to achieve some desired system characteristic such as increased performance or lower power consumption. Feedback from the profiling activity may be used to then select the fill policy either statically, or on a per-page basis to optimize system operation. In addition, data placement in memory may be altered to group like kinds of data items such that an optimized access policy may be implemented.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system comprising:
   a sector cache memory and a cache control unit, each sector of the sector cache memory including a plurality of blocks and each block including at least one word location;
   a main memory having at least one fill mode;
   a processor connected to the main memory and the sector cache memory and the cache control unit; and
   a memory management unit for providing attributes for a selected portion of the main memory, wherein at least one attribute corresponds to the at least one fill mode; and
   wherein the cache control unit is adaptable to perform a cache fill responsive to the provided attributes.

2. The data processing system of claim 1, the memory management unit further comprising:
   a translation look-aside buffer for translating a virtual address to a physical address for the selected portion of the main memory and including the attribute corresponding to that physical address defining an optimal fill mode for the selected portion of the main memory.

3. A data processing system comprising:
   a sector cache memory, each sector of the cache memory including a plurality of blocks and each block including at least one word location;
   a main memory;
   a processor connected to the main memory and the cache memory; and
   a cache line tag in the cache memory having a physical address tag and corresponding status bit for defining a fill mode corresponding to that physical address; and
   wherein, when a copy-back to main memory is performed and more than one block is indicated as including a modified word, the status bit also determines a mode for performing the copy-back.

4. A data processing system comprising:
   an instruction sector cache memory and control unit and a data sector cache memory and control unit, each sector of the instruction sector cache memory and the data sector cache memory including a plurality of blocks and each block including at least one word location;
   a main memory adaptable to at least two fill modes; and
   a processor connected to the main memory and each of said instruction sector cache memory and control unit and data sector cache memory and control unit; and
   wherein the instruction sector cache control unit is adaptable to perform a cache fill in a first fill mode and the data sector cache control unit is adaptable to perform a cache fill in a second fill mode wherein the first fill mode corresponds to a different transfer size than the second fill mode.

5. The data processing system of claim 4, wherein the cache fill for each transfer size is performed using a corresponding modulus.

6. A data processing system comprising:
   a sector cache memory and control unit, each sector of the cache memory including a plurality of blocks and each block including a plurality of word locations;
   a main memory having at least one burst length fill mode; and
   a processor connected to the main memory and the cache memory and control unit; and
   wherein the cache control unit is adaptable to perform a cache fill in one of at least two fill modes based on a main memory burst length fill mode of operation.

7. A method for accessing information in a data processing system, the data processing system including a processor and a cache memory for operating with a main memory, the method comprising:
   generating a request for information by the processor;
   determining if the requested information is in the cache memory wherein, in response to the determination, a cache fill operation in one of at least two fill modes is selected based on a predetermined mode of operation of the main memory;
   performing the selected cache fill operation in one of at least two fill modes wherein each fill mode corresponds to a different transfer size.

8. The method of claim 7, wherein the cache memory is organized as a sector cache memory and each sector of the cache memory includes a plurality of blocks.

9. The method of claim 7, further comprising;
   performing the cache fill operation for each transfer size using a corresponding modulus.

10. The method of claim 7, wherein the one of at least two fill modes corresponds to the transfer size of four units.

11. The method of claim 7, wherein the one of at least two fill modes corresponds to the transfer size of eight units.

12. A method for accessing information in a data processing system, the data processing system including a processor, a main memory and a cache memory, the method comprising:
   generating a request for information by the processor;
   determining if the requested information is in the cache memory;

providing attributes for a selected portion of the main memory and wherein at least one attribute corresponds to burst size of a cache fill operation; and performing the selected cache fill operation responsive to the provided attributes.

13. A method for accessing information in a data processing system, the data processing system including a processor, a main memory and a cache memory, the method comprising;

generating a request for information by the processor;

determining if the requested information is in the cache memory;

providing attributes for a selected portion of the main memory and wherein at least one attribute corresponds to at least one fill mode of a cache fill operation; and performing the selected cache fill operation responsive to the provided attributes;

translating a virtual address to a physical address for the requested information; and defining an optimal fill mode for the selected portion of the main memory using the attribute corresponding to that physical address.

14. A method for accessing information in a data processing system, the data processing system including a processor, a main memory and a cache memory, the method comprising:

generating a request for information by the processor;

determining if the requested information is in the cache memory; and defining a fill mode for the cache memory wherein each cache line in the cache memory includes a corresponding status bit for defining said fill mode; and wherein, when a copy-back to main memory is performed and more than one block is indicated as including a modified word, the status bit also determines a mode for performing the copy-back.

15. A data processing system comprising:

a sector cache memory and control unit, each sector of the cache memory including a plurality of blocks and each block including at least one word location;

a processor connected to the cache memory and control unit; and a memory management unit for providing attributes for selected processor address ranges, wherein at least one attribute corresponds to a burst length for a fill mode; and wherein the cache control unit is adaptable to perform a cache fill responsive to the provided attributes.

16. The data processing system of claim 15, wherein the cache control unit is adaptable to perform a cache fill responsive to the provided attributes coincident with performance of an address translation and to perform a cache fill at a predetermined burst length in the absence of an address translation.

* * * * *